United States Patent
Radocchia et al.

(10) Patent No.: US 10,210,527 B2
(45) Date of Patent: Feb. 19, 2019

(54) OPEN REGISTRY FOR IDENTITY OF THINGS INCLUDING SOCIAL RECORD FEATURE

(71) Applicant: Chronicled, Inc., San Francisco, CA (US)

(72) Inventors: Samantha Radocchia, San Francisco, CA (US); David Aho, New York, NY (US); Ryan Orr, Brisbane, CA (US); Maurizio Greco, San Francisco, CA (US)

(73) Assignee: Chronicled, Inc., San Francisco, CA (US)

( * ) Notice: Subject to any disclaimer, the term of this patent is extended or adjusted under 35 U.S.C. 154(b) by 168 days.

(21) Appl. No.: 15/206,239

(22) Filed: Jul. 9, 2016

(65) Prior Publication Data
US 2016/0358187 A1    Dec. 8, 2016

Related U.S. Application Data

(63) Continuation-in-part of application No. 15/173,461, filed on Jun. 3, 2016.
(Continued)

(51) Int. Cl.
*H04L 29/06* (2006.01)
*G06Q 30/00* (2012.01)
(Continued)

(52) U.S. Cl.
CPC ... *G06Q 30/0185* (2013.01); *G06F 17/30864* (2013.01); *G06Q 40/04* (2013.01);
(Continued)

(58) Field of Classification Search
CPC ...... G06Q 20/12; G06Q 20/223; G06Q 30/06; G06Q 20/065; G06Q 20/3678;
(Continued)

(56) References Cited

U.S. PATENT DOCUMENTS 8,271,381 B2    9/2012    O'Brien et al.
8,370,491 B1    2/2013    Breau et al.
(Continued)

FOREIGN PATENT DOCUMENTS

WO    9419770 A1    9/1994
WO    2004036802 A1    4/2004

OTHER PUBLICATIONS

International Search Report and Written Opinion from International Application No. PCT/USI7/54004.
(Continued)

*Primary Examiner* — Chau Le
(74) *Attorney, Agent, or Firm* — Haverstock & Owens LLP

(57) ABSTRACT

An identity system for the Internet of Things (IOT) that enables users and machines to identify, authenticate and interact with products and collectibles without relying on a third-party-controlled authentication service. The system includes wireless tamperproof tags coupled to products and an open registry database where a chain of ownership of the items is able to be stored. The open registry enables public access to the item identity and data combined with item registration anonymity.

34 Claims, 10 Drawing Sheets

Related U.S. Application Data

(60) Provisional application No. 62/230,344, filed on Jun. 4, 2015, provisional application No. 62/231,586, filed on Jul. 10, 2015, provisional application No. 62/285,085, filed on Oct. 19, 2015, provisional application No. 62/285,748, filed on Nov. 9, 2015, provisional application No. 62/342,850, filed on May 27, 2016.

(51) Int. Cl.

| | | |
|---|---|---|
| *G07C 9/00* | (2006.01) | |
| *G06F 17/30* | (2006.01) | |
| *G06Q 40/04* | (2012.01) | |
| *H04W 4/80* | (2018.01) | |
| *H04L 9/32* | (2006.01) | |
| *H04W 4/00* | (2018.01) | |
| *H04W 12/06* | (2009.01) | |
| *H04W 12/10* | (2009.01) | |

(52) U.S. Cl.
CPC ........ *G07C 9/00111* (2013.01); *H04L 9/3247* (2013.01); *H04L 9/3271* (2013.01); *H04L 63/061* (2013.01); *H04L 63/0876* (2013.01); *H04L 63/126* (2013.01); *H04W 4/008* (2013.01); *H04W 4/80* (2018.02); *H04W 12/06* (2013.01); *H04W 12/10* (2013.01); *G06Q 2220/00* (2013.01)

(58) Field of Classification Search
CPC ............... G06Q 30/0185; G06Q 40/04; G06Q 2220/00; H04L 2209/38; H04L 63/126; H04L 9/3271; H04L 9/3247; H04L 63/0876; H04L 63/061; H04W 4/80; H04W 12/10; H04W 12/06; G06F 17/30864; G07C 9/00111
See application file for complete search history.

(56) References Cited

U.S. PATENT DOCUMENTS

| | | |
|---|---|---|
| 8,371,501 B1 | 3/2013 | Hopkins |
| 2004/0060976 A1 | 4/2004 | Blazey et al. |
| 2004/0066278 A1 | 4/2004 | Hughes et al. |
| 2006/0082438 A1 | 4/2006 | Bazakos et al. |
| 2006/0230276 A1 | 10/2006 | Nochta |
| 2007/0095903 A1 | 5/2007 | Suenbuel |
| 2007/0273558 A1 | 11/2007 | Smith et al. |
| 2008/0223275 A1 | 9/2008 | Kishi et al. |
| 2009/0167489 A1 | 7/2009 | Nan et al. |
| 2010/0005299 A1 | 1/2010 | Wase |
| 2010/0060431 A1 | 3/2010 | Stevenson et al. |
| 2010/0325427 A1 | 12/2010 | Ekberg et al. |
| 2012/0032805 A1 | 2/2012 | Brodzik et al. |
| 2012/0127976 A1 | 5/2012 | Lin et al. |
| 2014/0108258 A1 | 4/2014 | Williams |
| 2014/0136431 A1 | 5/2014 | Dahod et al. |
| 2014/0266591 A1 | 9/2014 | Klammer et al. |
| 2015/0039470 A1* | 2/2015 | Crites ................ G06Q 30/0623 705/26.61 |
| 2015/0134552 A1 | 5/2015 | Engels et al. |
| 2016/0098730 A1 | 4/2016 | Feeney |
| 2016/0164884 A1 | 6/2016 | Sriram et al. |
| 2016/0192188 A1 | 6/2016 | Coulier |
| 2016/0253622 A1 | 9/2016 | Sriram |
| 2016/0300234 A1* | 10/2016 | Moss-Pultz ........ G06Q 20/3829 |
| 2016/0358158 A1* | 12/2016 | Radocchia ........... G07G 1/0081 |
| 2016/0358184 A1* | 12/2016 | Radocchia ............. H04W 4/70 |
| 2016/0358186 A1 | 12/2016 | Radocchia et al. |
| 2017/0300928 A1 | 10/2017 | Radocchia et al. |
| 2017/0345019 A1* | 11/2017 | Radocchia ........... G06Q 30/018 |
| 2018/0012311 A1* | 1/2018 | Small ..................... B33Y 50/02 |
| 2018/0019872 A1* | 1/2018 | Radocchia ........... G06Q 30/018 |
| 2018/0032759 A1* | 2/2018 | Radocchia ........... G06Q 30/018 |
| 2018/0053161 A1* | 2/2018 | Bordash ............... G06Q 20/102 |
| 2018/0108024 A1* | 4/2018 | Greco ..................... G06F 21/44 |
| 2018/0211718 A1* | 7/2018 | Heath .................... G16H 10/65 |
| 2018/0264347 A1* | 9/2018 | Tran ....................... G16H 50/20 |

OTHER PUBLICATIONS

International Preliminary Report on Patentability from PCT Application No. PCT/US2016/035902, dated Dec. 14, 2017.
International Search Report from PCT/US16/035902 dated Oct. 26, 2016.
International Search Report and Written Opinion for PCT Application No. PCT/US17/55605.
International Search Report and Written Opinion from International Application No. PCT/US2017/056791.

* cited by examiner

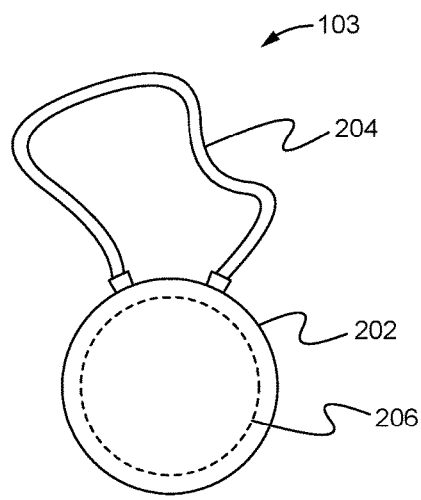
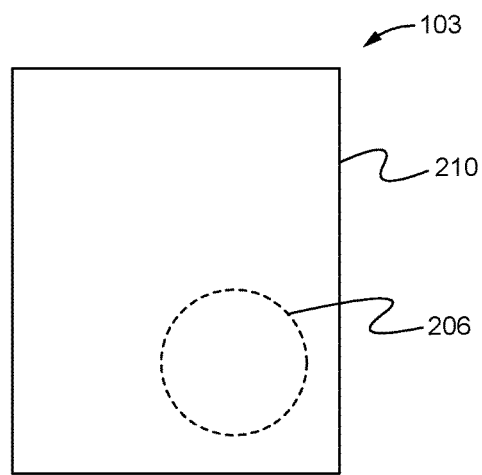
Fig. 2A  Fig. 2C
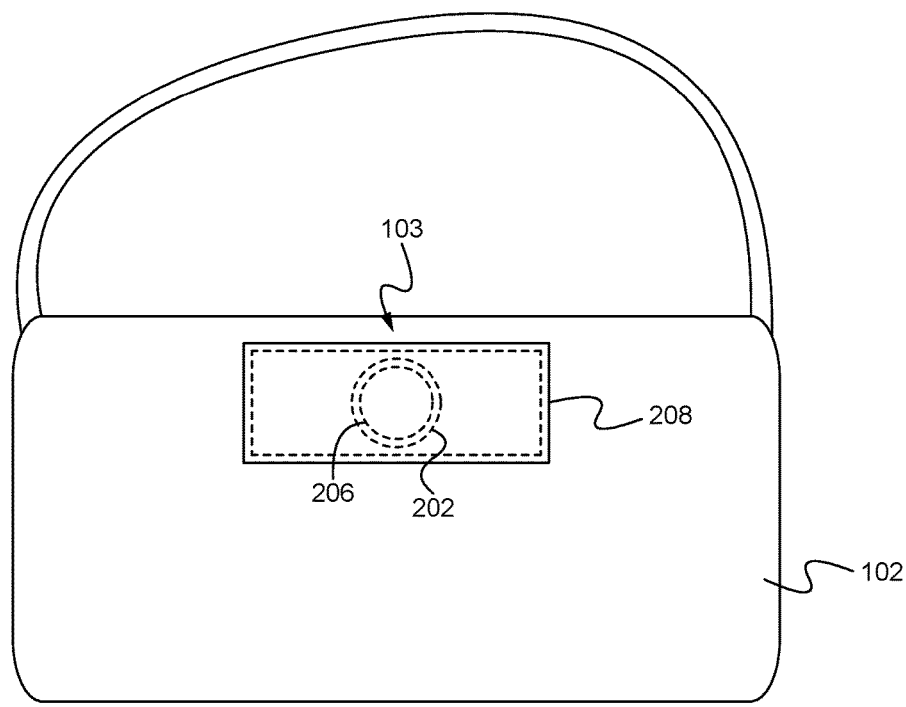
Fig. 2B

← CHRONICLED ⋮  ⟵ 800

☺ John Doe                                      234,234 followers

Air Jordan 4 Retro
Size 10      -Used      (o) authenticity verified ( Add to Wishlist )

( Make an Offer )

Current market value ~ $1500

---

DESIGN INSPIRATION
The air jordan 4 Doernbecher was designed by Doernbacher hospital cancer patient, Isaiah Scott and released on November 5th, 2011. The shoe was centered around the Superman theme, which was the nickname given to Isaiah during his cancer treatment. Featuring a Black upper with an up and down arrow pattern to represent life's ups and downs as well as a picture of Isaiah on the outer heal.

---

TIMELINE

[This Month]

○ condition changed to Used
   July 3, 2015

○ @jason added a photo   
   July 2, 2015

○ Ownership transferred to @kevin
   July 2, 2015

[2 Months Ago]

○ Claimed by @kevin
   June 30, 2015

[1 year ago]

○ Authenticity verified by Chronicled
   Jan 2, 2014

○ Released by Nike
   Jan 1, 2014

○ Designed by Isaiah Scott   
   Jan 1, 2013

Fig. 8A

← CHRONICLED ⋮ ← 800

ⓒ Jane Doe 5,000 followers

RVM Arrow Flat Jacquard
Black/White
Size 10    -Used    (o) authenticity verified ( Add to Wishlist )

( Make an Offer )

Current market value ~ $1500

---

TIMELINE

[This Month]

○ ownership transferred to @tina
July 6, 2015

[2 Months Ago]

○ @tom added a photo
June 16, 2015

"They both look great!"

○ Value increased to $1500
June 6, 2015

○ Spotted on a Celeb!
June 3, 2015

"Taylor swift wore it to the grammys"

○ @jessica added a photo
June 3, 2015

"It goes perfectly with those shoes."

○ Claimed by @jessica
June 1, 2015

[1 year ago]

○ Authenticity verified by Chronicled
July 1, 2014

○ Released by RVM
June 26, 2014

Fig. 8B

OPEN REGISTRY FOR IDENTITY OF THINGS INCLUDING SOCIAL RECORD FEATURE

RELATED APPLICATIONS

This application is a continuation in part of the co-pending U.S. patent application Ser. No. 15/173,461, filed Jun. 3, 2016, and titled "OPEN REGISTRY FOR IDENTITY OF THINGS" and claims priority under 35 U.S.C. § 119(e) of the U.S. provisional patent application Ser. No. 62/230,344 filed Jun. 4, 2015, and titled "SMART APPAREL LABEL CONTAINING A MICROCHIP SO THAT A CONSUMER CAN VERIFY AUTHENTICITY OF AN APPAREL ITEM FROM A MOBILE DEVICE," the U.S. provisional patent application Ser. No. 62/231,586 filed Jul. 10, 2015, and titled "PKI-ENABLED TAG," the U.S. provisional patent application Ser. No. 62/285,085 filed Oct. 19, 2015, and titled "TIMELINE FOR CONSUMER/LUXURY PRODUCTS THAT TRACKS OWNERSHIP, PROVENANCE, AND KEY DATA POINTS/EVENTS IN THE LIFE OF THE PRODUCT," the U.S. provisional patent application Ser. No. 62/285,748 filed Nov. 9, 2015, and titled "ONE-PIECE EXTERNAL PLASTIC TAG CONTAINING ENCRYPTED MICROCHIP FOR COLLECTIBLE AND LUXURY CONSUMER GOODS AUTHENTICITY VERIFICATION AND CONSUMER-BRAND ENGAGEMENT," and the U.S. provisional patent application Ser. No. 62/342,850 filed May 27, 2016, and titled "USING PROOF OF PROXIMITY TO SERVE-UP PRIVATE DATA ABOUT PHYSICAL OBJECTS IN THE CONSUMER INTERNET OF THINGS, AND TO SUPPORT AN VARITY PROVABLE LOGISTICS, SOCIAL, COMMERCE, AND SECONDARY," all of which are hereby incorporated by reference.

FIELD OF THE INVENTION

The present invention relates to the field of the unique identity of things, including products, collectibles and identity/internet of things devices. More particularly, the present invention relates to identification, authentication and provenance tracking using identifying tags and an open registry.

BACKGROUND OF THE INVENTION

Physical assets are poorly represented on the Internet, public databases or marketplaces. Current identification methods are often not machine-readable. Also, existing tags are not secure as they are able to easily be forged and/or re-applied to a different non-authentic asset. In particular, technologies that help prevent the duplication of tags are weak and rely on obfuscation methods (which can be hacked) or require the use of private databases (e.g. privately controlled) which rely on trusting a third party (e.g. the controlling party) to accurately maintain the database. Such methods do not prevent the third party from creating duplicate tags or database records, nor are they able to exist if/when the third party dissolves or goes out of business. Finally, such a third party controlled system lacks the ability for users to seamlessly migrate their identity and/or proof of ownership to other systems.

SUMMARY OF THE INVENTION

An identity verification and authentication system that enables users and machines to assign and authenticate the identity of things without relying on a third-party-controlled identity verification or authentication service. Things are any physical object, including products, collectibles and identity of things devices. The system includes wireless tamperproof tags coupled to things and an open registry database where a chain of ownership of the things is able to be stored. The open registry enables public access to the identification data with optional item registration anonymity. In some embodiments, the open registry is a database, a blockchain or a smart contract.

A first aspect is directed to an item profile, open registry and authentication system. The system comprises one or more physical items, one or more identity tags each coupled to one of the items, the identity tags each storing a private key and a unique identifier and configured to enable the unique identifier to be wirelessly read but prevent the private key from being read from the tag, a mobile device storing an item application and configured to wirelessly read the unique identifier from one or more of the identity tags when proximate to the one or more of the tags, wherein the item application generates and stores an item profile including item information for each of the items and displays the item profile associated with one of the items when the identity tag coupled to the one of the items is scanned by the device and a open registry storing the unique identifier and a public key of each of the items, wherein the public key is associated with the private key stored on the identity tag coupled to the item. In some embodiments, the open registry stores a chain of ownership that defines a sequence of owners of each of the items and a sequence of transactions between pairs of the owners that conferred the ownership of the item between the pairs. In some embodiments, the item application, for each of one or more of the items, dynamically automatically imports the chain of ownership of the item from the open registry and posts onto the item profile ownership data describing all of the transfers of ownership recorded based on the chain of ownership. In some embodiments, when the chain of ownership of one or more of the items changes on the open registry due to a transaction, the item application automatically updates the ownership data of the one or more items to reflect the changes. In some embodiments, the item application enables an owner of one of the items to select which of the item information is included within the item profile of the item. In some embodiments, for each of the items, the item application enables users to post to the item profile ratings of the item and pictures of the item to the item. In some embodiments, for each of the item profiles, when displaying the item profile the application orders all of the posts such that the posts are displayed chronologically. In some embodiments, the item application enables the owner of one or more of the items to add a purchase feature to the item profile of the one or more items, wherein the purchase feature enables users to submit a purchase price, submit a monetary offer or submit a trade offer in order to purchase the item. In some embodiments, the application enables a plurality of the items owned by the same owner to be grouped into a collection by the owner such that users are able to search based on or browse within a selected one or more of the collections, and further wherein the item application generates a collection profile for the collection. In some embodiments, at least on of the item profiles include a network accessible location related to the item including information about the item. In some embodiments, when the open registry indicates that ownership of one or more of the items has been transferred form a previous owner to a new owner, the item application automatically switches control over the item profiles of the one or more items from an account of the previous owner to an account of the new owner.

A second aspect is directed to a mobile device for use in an item open registry and authentication system. The mobile device comprises a wireless signal transceiver for communicating data wirelessly between the mobile device and one or more identity tags each coupled to one of one or more physical items, the identity tags each storing a private key and a unique identifier and configured to enable the unique identifier to be wirelessly read but prevent the private key from being read from the tag, a network interface for communicating with an open registry storing the unique identifier, item information and a public key of each of the items, wherein the public key is associated with the private key stored on the identity tag coupled to the item and a non-transitory computer readable medium storing an item application that controls the communication between the mobile device and the tags and the registry, automatically wirelessly searches for the tags and prompts a user on the mobile device when one of the tags is discovered, and further wherein the item application generates and stores an item profile including item information for each of the items and displays the item profile associated with one of the items when the identity tag coupled to the one of the items is scanned by the transceiver. In some embodiments, the open registry stores a chain of ownership that defines a sequence of owners of each of the items and a sequence of transactions between pairs of the owners that conferred the ownership of the item between the pairs. In some embodiments, the item application, for each of one or more of the items, dynamically automatically imports the chain of ownership of the item from the open registry and posts onto the item profile ownership data describing all of the transfers of ownership recorded based on the chain of ownership. In some embodiments, when the chain of ownership of one or more of the items changes on the open registry due to a transaction, the item application automatically updates the ownership data of the one or more items to reflect the changes. In some embodiments, the item application enables an owner of one of the items to select which of the item information is included within the item profile of the item. In some embodiments, for each of the items, the item application enables users to post to the item profile ratings of the item and pictures of the item to the item. In some embodiments, for each of the item profiles, when displaying the item profile the application orders all of the posts such that the posts are displayed chronologically. In some embodiments, the item application enables the owner of one or more of the items to add a purchase feature to the item profile of the one or more items, wherein the purchase feature enables users to submit a purchase price, submit a monetary offer or submit a trade offer in order to purchase the item. In some embodiments, the application enables a plurality of the items owned by the same owner to be grouped into a collection by the owner such that users are able to search based on or browse within a selected one or more of the collections, and further wherein the item application generates a collection profile for the collection. In some embodiments, at least on of the item profiles include a network accessible location related to the item including information about the item. In some embodiments, when the open registry indicates that ownership of one or more of the items has been transferred form a previous owner to a new owner, the item application automatically switches control over the item profiles of the one or more items from an account of the previous owner to an account of the new owner. In some embodiments, in response to a successful authentication of one of the items by the item application, the item application automatically accesses and displays the network accessible location on a display of the mobile device. In some embodiments, the network accessible location is a website related to the item including information about the item.

A third aspect is directed to a method of using an item application of an authentication system including one or more physical items, one or more identity tags each coupled to one of the items, the identity tags each storing a private key and a unique identifier and configured to enable the unique identifier to be wirelessly read but prevent the private key from being read from the tag, a mobile device storing the item application and configured to wirelessly read the unique identifier from one or more of the identity tags when proximate to the one or more of the tags, and a open registry storing the unique identifier and a public key of each of the items, wherein the public key is associated with the private key stored on the identity tag coupled to the item. The method comprises generating and storing an item profile including item information for each of the items with the item application and displaying the item profile associated with one of the items with the item application when the identity tag coupled to the one of the items is scanned by the mobile device. In some embodiments, the open registry stores a chain of ownership that defines a sequence of owners of each of the items and a sequence of transactions between pairs of the owners that conferred the ownership of the item between the pairs. In some embodiments, the method further comprises, for each of one or more of the items, dynamically automatically importing the chain of ownership of the item with the item application from the open registry and posting with the item application, onto the item profile, ownership data describing all of the transfers of ownership recorded based on the chain of ownership. In some embodiments, the method further comprises, when the chain of ownership of one or more of the items changes on the open registry due to a transaction, automatically updating the ownership data of the one or more items with the item application to reflect the changes. In some embodiments, the method further comprises enabling an owner of one of the items to select which of the item information is included within the item profile of the item with the item application. In some embodiments, the method further comprises, for each of the items, enabling users to post to the item profile ratings of the item and pictures of the item to the item with the item application. In some embodiments, the method further comprises, for each of the item profiles, when displaying the item profile, ordering all of the posts with the item application such that the posts are displayed chronologically on the device. In some embodiments, the method further comprises enabling the owner of one or more of the items to add a purchase feature to the item profile of the one or more items with the item application, wherein the purchase feature enables users to submit a purchase price, submit a monetary offer or submit a trade offer in order to purchase the item. In some embodiments, the method further comprises enabling a plurality of the items owned by the same owner to be grouped into a collection by the owner by the item application such that users are able to search based on or browse within a selected one or more of the collections and generating a collection profile for the collection with the item application. In some embodiments, at least on of the item profiles include a network accessible location related to the item including information about the item. In some embodiments, the method further comprises, when the open registry indicates that ownership of one or more of the items has been transferred form a previous owner to a new owner, automatically switching control over the item profiles of the one or more items from an account of the previous owner to an account of the new owner with the item application. In some embodiments, the method further comprises, in response to a successful authentication of one of the items by the item application, automatically accessing and displaying the network accessible location on a display of the mobile device with the item application. In some embodiments, the network accessible location is a website related to the item including information about the item.

BRIEF DESCRIPTION OF THE DRAWINGS

FIG. 2A illustrates a tag according to some embodiments.
FIG. 2B illustrates a tag according to some embodiments.
FIG. 2C illustrates a tag according to some embodiments.

FIGS. 8A and 8B illustrate exemplary item descriptions including timelines according to some embodiments.

DETAILED DESCRIPTION OF THE INVENTION

Embodiments described herein are directed to an identity verification and authentication system that enables users, devices and machines to verify the identity of things and authenticate them without relying on a third-party-controlled authentication service. The system enables users to discover, review and authenticate collectable products. The system includes wireless tamperproof tags coupled to things and an open registry database where a chain of ownership of the things is able to be stored. As a result, by easily scanning a tag with a device having an authentication application, a user is able to use the system to immediately determine whether the thing coupled to the tag is authentic as well as be provided with a history of ownership and description of the thing to ensure an entity has the right to sell the thing. Additionally, the application on the device is able to enable the discovery, review and/or transfer of things having tags. Thus, the system provides the advantage of thing discovery, review and purchase certainty in a field of common forgeries. Further, the open registry enables public access to the authentication data combined with a registration protocol that is technology agnostic and having selectable item registration anonymity such that the users do not have to rely on a third party for the authentication while the merchandisers or registrants can register their products without making public on the database to competitors product line roll-out/release quantities. Finally, registration protocol of the open registry is able to enable submission of item data including a network accessible location (link and/or address) that the system can use to access to a cloud service that can serve digital content related to the thing/product or execute programs related to the thing/product.

Figure 1:
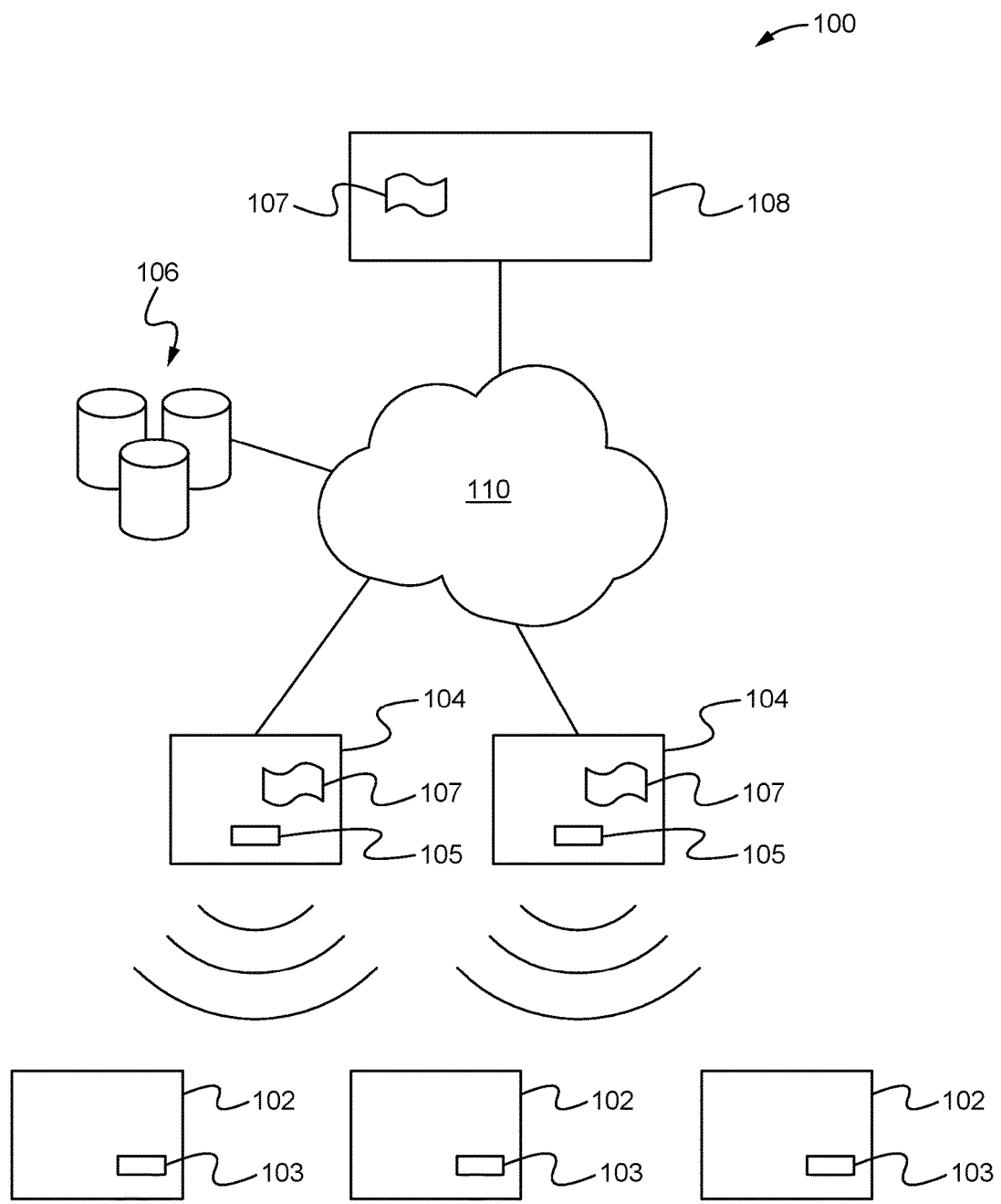
FIG. 1 illustrates an item open registry authentication system according to some embodiments.

FIG. 1 illustrates an item open registry authentication system 100 according to some embodiments. As shown in FIG. 1, the system 100 comprises one or more items 102 each having an identity (and/or authentication) tag 103, one or more computing devices 104 each having a receiver/transmitter 105, an open registry 106 and one or more servers 108, wherein the servers 108, the registry 106 and/or the devices 104 are communicatively coupled via one or more networks 110. Although as shown in FIG. 1, a single server 108 is coupled with two client devices 104, it is understood that any number of servers 108 are able to be coupled with any number of devices 104. The networks 110 are able to be one or a combination of wired or wireless networks as are well known in the art. The one or more servers 108 are able to store at least a portion of an item agent and/or application 107 including a graphic user interface on a memory of one or more of the servers 108. As a result, a user is able to download the application 107 from the servers 108 over the network 110 onto one or more of the devices 104. After being downloaded to the client device 104, the application 107 is able to create and use an application database within the local memory on the device 104 to store and utilize data necessary for operation.

Alternatively, some or all of the data is able to be stored in a server database on the memory on the servers 108 such that the application 107 is able to connect to the servers 108 over the networks 110 in order to utilize the data on the server database. For example, the locally executing application 107 on the devices 104 is able to remotely communicate with the servers 108 over the network 110 to perform any features of the application 107 and/or access any data on the server database not available with just the data on the device 104. In some embodiments, the same data is stored on both the server database and one or more of the devices 104 such that either local or remote data access is possible. In such embodiments, the data on the servers 108 and/or devices 104 is able to be synchronized by the application. In some embodiments, the server database and/or application 107 is distributed across a plurality of the servers 108. Alternatively or in addition, one or more of the servers 108 are able to store all of the database and/or application data. In such embodiments, the servers 108 are able to perform a synchronization process such that all the databases and/or other application data are synchronized.

Alternatively, the application 107 is able to be replaced or supplemented with an item agent and/or website stored on the server memory and executed by the servers 108, wherein the agent and/or website provides some or all of the functionality of the application 107 with a website user interface that is substantially similar to the application user interface. In such embodiments, a device 104 is able to access the agent and/or website and utilize the features of the agent and/or website with a web browser that communicates with the servers 108 over the networks 110. In some embodiments, the functionality of the website is able to be limited to facilitating the downloading of the application 107 onto one or more devices 104. In other words, the application/agent 107 is able to operate on just the servers 108, just the devices 104 or a combination of the servers 108 and devices 104. Accordingly, it should be noted that although described according to an exemplary functional distribution herein, other distributions of the functions of the application/agent 107 between the servers 108 (via the agent/website) and the devices 104 (via the application) are contemplated but not included for the sake of brevity. Alternatively, the device 104 is able to be an autonomous machine such as a drone or an identity/internet of things (IOT) device. In such embodiments, the application 107 is able to be already installed in the device 104 or is able to be part of the software or firmware operating the device 104 itself.

Further, the servers 108 are able to store item information describing one or more of the items 102 (e.g. text, audio, photos and/or video describing brand/product) and associated with the public key and/or unique identifier stored on the tags 103 coupled to the items 102. As a result, when one of the devices 104 scan/read one or more of the tags 103 on one or more of the items 102, an authentication function of the application 107 on the device 104 is able to communicate the public key and/or the unique identifier of the scanned tags 103 to the server(s) 108, which then are able to provide the item information associated with the key/identifier to the device 104 for display to the user. In some embodiments, the item information is able to comprise one or more links to or addresses of network accessible locations (e.g. uniform resource identifiers), wherein the locations include information about the items. In such embodiments, when one of the devices 104 scan/read one or more of the tags 103 on one or more of the items 102, the application 107 on the device 104 is able to communicate the public key and/or the unique identifier of the scanned tags 103 to the server(s) 108, which then are able to provide the links/addresses enabling the application 107 on the device to access the locations (and the server(s) operating the locations) on the device 104 (e.g. via a web browser). In some embodiments, the item information and associated public keys/unique identifiers are uploaded to the servers 108 during a registration process.

The computing devices 104 are able to be any computing device having a memory for storing at least a portion of the application 107 and a wireless tag reading feature 105 capable of wirelessly reading and/or communicating with the tags 103. In some embodiments, the devices 104 comprise a display (e.g. a touchscreen). Examples of suitable computing devices 104 capable of including the reading feature 105 and/or storing the application 107 include smart jewelry (e.g., smartwatch), a personal computer, a laptop computer, a computer workstation, a server, a mainframe computer, a handheld computer, a personal digital assistant, a cellular/mobile telephone, an IOT device, a smart appliance, a game console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system or any other suitable computing device.

The items 102 are able to be collectibles, IOT devices, apparel, shoes, hand bags, garments or other commonly forged or collectable physical items. For example, the items are able to be a brand name purse or pair of shoes where because of the existence of numerous knockoffs, it can be difficult to prove that the items are authentic for the purpose of transfers/sales from a current owner to a prospective buyer. In some embodiments, the items 102 are also able to be automobiles, vehicles, boats, collectibles and the like.

FIGS. 2A-C illustrate the tags 103 according to some embodiments. As shown in FIG. 2A, the tag 103 is able to be an external tag that comprises a tamperproof body 202, a tamperproof fastening mechanism 204 (e.g. a ring), with the body 202 housing an authentication circuit 206. The body 202 and/or fastening mechanism 204 are able to be formed by a single contiguous piece of plastic such that the circuit 206 is entirely sealed within the body 202 and/or fastening mechanism 204. As a result, the circuit 206 cannot be physically removed or tampered without breaking the body 202 and/or fastening mechanism 204. Additionally, the body 202 and/or fastening mechanism 204 are able to be coupled with the circuit 206 such that decoupling of the tag 103 from the item 102 damages the circuit 206 such that the circuit 206 is unable to be read and/or transmit any stored data, or the circuit 206 transmits warning data indicating that tampering occurred. As shown in FIG. 2B, the tag 103 is also able to be an internal tag that is substantially similar to the external tag of FIG. 2A except that instead of the fastening mechanism 204 the internal tag is able to be stitched into a label or other material of the item 102. Specifically, the body 202 is able to be entirely enveloped by two pieces/layers of fabric or other material of the item 102 stitched or otherwise coupled together around the body 202 (e.g. like a sealed pouch). In some embodiments, at least one of the layers is able to be a label of the item 102 and include writing describing the item 102 (e.g. the brand name). In some embodiments, the body 202 and the circuit 206 within the body 202 of the internal tag is able to be flexible such that the item 102 is able to flex without damaging the tag 103. As shown in FIG. 2C, the tag 103 is able to be an electronic device 210 wherein the circuit 206 is integrated into the circuitry of the electronic device 210. For example, the electronic device 210 is able to be a printed circuit board or other electronics with wireless communication capabilities (e.g. an IOT device). As a result, all embodiments of the tags 103 provide the benefit of ensuring that the identification and authentication data stored on the tags 103 are securely coupled to the proper item 102 for authentication/identification purposes or that tampering with the tags 103 and/or item 102 is easily determined.

The circuit 206 is able to communicate wirelessly via near field communication, bluetooth low energy, radio frequency identification, bluetooth, WiFi or other types of wireless communication known in the art. Further, the circuit 206 is able to be public key infrastructure enabled. Specifically, the circuit 206 is able to store a unique identifier and a private key and wirelessly communicate with the readers 105 of the devices 104. The private key is secret and cannot be read or extracted from the tag 103 (e.g. cannot be read by the reader 105). In contrast, the unique identifier is able to be read by a reader 105 and/or otherwise transmitted from the tag 103 to one or more of the devices 104 when requested by the devices 104. The private key is an encryption key that is associated with a corresponding public key. In other words, the public key and private keys are related such that data encrypted with the public key are only able to be decrypted using the private key and digital signatures generated by the private key are only able to be validated using the public key. As a result, as described in detail below, the private key of each of the tags 103 is able to be used to authenticate the item 102 to which the tag 103 is coupled. Specifically, the circuit 206 is able to digitally sign a challenge message received from a device 104 (via the reader 105) using the private key and transmit the digital signature back to the device 104 for authentication of the item 102. Alternatively, the circuit 206 is able to perform other authentication processes on the challenge message using the private key in response to a challenge message from a device 104.

The unique identifier is able to be the public key (associated with the private key stored on the tag 103), a hash of the public key, a universally unique identifier (UUID) or other unique identifier. Additionally, in some embodiments, the circuit 206 is able to store data related to the item 102 to which the tag 103 is attached (e.g. text, photos, video and/or audio describing the item 102 and/or registrant). In such embodiments, when scanned by the reader 105, the circuit 206 is able to send the item-related data to the application on the device 104 which then automatically presents the data to the user of the device 104.

The open registry 106 stores registry data and is able to be a database, a blockchain, or a smart contract whose records are open to the public (e.g. access to view records is not permission based, but ownership/transfer protocol requirements for making changes to database). For example, the registry 106 is able to be a distributed database (e.g. across a plurality of computing devices that each store copies of transactions in one or more linked blocks) that maintains a continuously-growing list of data records (e.g. descriptions of the items associated with the unique identifiers, provenance or chain of ownership transactions associated with pairs of public keys and unique identifiers) hardened against tampering and revision. In some embodiments, the registry 106 consists of data structure blocks which hold exclusively data (e.g. public keys, ownership data, item identification data) with each block holding batches of individual transactions and the results of any blockchain executables. Alternatively, the blocks are able to store both data and programs. Each block of the blockchain contains a timestamp and information linking it to a previous block thereby defining the chain and maintaining a chronological order of each of the records/transactions. Thus, the registry 106 provides the advantages of, unlike private third party databases which are controlled by the third party and often require permission for data access, the data (e.g. chain of ownership information, other information related to the item associated with the unique identifier) of the open registry 106 is able to be self-controlled (based on the transaction rules inherent to the database) and publically accessible/viewable without any privileged permissions required. Alternatively, the open registry 106 is able to be a non-blockchain database.

The registry data is able to comprise pairs of public keys and item unique identifiers uploaded by registrants or other owners of keys/items. The registrants are able to be manufacturers, authenticators, owners and/or other entities associated with the item 102. The registry data is also able to comprise item information such as network accessible locations (e.g. websites, cloud servers) or links thereto. This item information is able to be associated with one or more of the pairs and optionally made accessible or not accessible to the public. Additionally, unlike other databases, the registry 106 is able to enable the upload or creation of new entries of pairs of item identifiers and public keys (e.g. as registered by a registrant that just manufactured the items 102 associated with the identifiers) without also associating data with the pairs that identifies the source of the pairs. In other words, if desired, the registry 106 protects registrants from competitors being able to access the registry 106 and determine the quantity of a new product/item rollout or release based on the number of pairs by shielding the source of the pairs from public view. In some embodiments, the shielding is in the form of preventing public access to associated source data. Alternatively, the shielding is able to be in the form of enabling the registration of new pairs without any source information such that even if all the data was publicly accessible the registry 106 does not include any source information (that is associated with the pairs) to be accessed. Alternatively, the registry 106 is provides the registrants the option to include the source information such that the source information is publically associated with the new pairs.

Also, as described above, the item information data uploaded by a registrant onto the registry 106 along with the pairs is able to comprise one or more links to or addresses of network accessible locations (e.g. uniform resource identifiers), wherein the locations (e.g. a cloud, website) include information about the items. In such embodiments, when one of the devices 104 scan/read one or more of the tags 103 on one or more of the items 102, the application 107 on the device 104 is able to communicate the public key and/or the unique identifier of the scanned tags 103 to the registry 106 in order to retrieve the associated network accessible location(s). In some embodiments, this access is a part of a proof of proximity process as described below. As a result, the registrants are able to limit access to the locations unless a device 104 is able to prove that it is in proximity to the item 102 as well as help provide the source shielding described above. Alternatively or in addition, the item information and associated public keys and/or unique identifiers are uploaded to the servers 108 and/or devices 104 during a registration process as described in detail below.

The application 107 is able to comprise an authentication module, a proximity module, a discovery module, a collections module, an ownership module, a transaction module, a notification/follow module and a description module, wherein the application 107 and the modules use the application database to store, maintain and access data necessary for the operation of the application 107. The authentication module is able to automatically perform the authentication process described below when a device 104 reads one of the tags 103 coupled to an item 102.

The description module is able to provide an item description on the device 104 upon selection of the item 102 from a description feature and/or in response to reading a tag 103 coupled to the item 102. In particular, the description module is able to access the item information stored on the device 104 and/or the servers 108 for the selected/scanned item 102, as described above, and display the item information upon selection of (or scanning of) by a user. In some embodiments, the description module is able to display the item description on the device 104 including an item timeline or profile that chronologically displays the item information in order to represent the "life" of the item 102. For example, a starting entry of the timeline is able to include when the item 102 was first released or created followed by one or more events or parameters that happened/change with respect to the item 102. In addition to the item information described elsewhere herein, the item information displayed within the item profiles is able to comprise one or more of:

Transaction-related events (sold to, purchased from, traded for, gift);

Product information (designer name, design collateral/assets, sketches, pictures, audio, video, release date, brand, product origin story, materials, fabrics, other components, supply chain information, factory of origin, rarity/known quantity in existence);

Historical/Social/Cultural Significance (relevant current/past events surrounding the item, design or release, item spotted worn or used by a celebrity, item mentioned in the media via television, radio, print, internet, films, advertisements (media outlet tag), other owners of same product);

Ownership/Provenance (released by (e.g. brand), sold by (e.g. retailer), claimed by (e.g. first owner), transferred to (e.g. subsequent owner));

Authenticity (verified by, appraised by, authenticated by (e.g. chronicled, sotheby's, other verification/appraisal/authentication entities);

Condition (changes in condition (e.g. new, like new, used, retired, mint, grade), autographed by (e.g. celebrity, designer, other users));

Metadata (user generated/submitted content (e.g. photos, hyperlinks, captions, location, audio, video), brand generated/submitted content (e.g. deals, promotions, advertisements)); and Pricing (value/price change over time period, projected value change over period in future, highest historical value, lowest historical value, highest sale price, lowest sale price, average sale price).

For example, FIGS. 8A and 8B illustrate exemplary item descriptions including timelines 800 according to some embodiments. FIG. 8A illustrates an item description for a pair of shoes and FIG. 8B illustrates an item description for a jacquard. As a result, the description module provides the advantage of enabling a life of an item 102 to be represented by a chronological timeline that shows potential buyers and other users how the item has changed and what events it has been a part of throughout its "life." Thus, the description module makes determining a valuation of the items 102 a much more rich and dynamic analysis including more than mere rarity and condition.

The collections module is able to enable user to group two or more of the items 102 owned by the user into a collection such that the items 102 forming the collection are associated with each other for the purposes of searching, sorting and/or presentation by the description module. Further, in some embodiments each collection is able to have an collection description similar to the item timelines for the individual items, but where the collection description relates to all of the items 102 as a group instead of individually (e.g. collection valuation, condition, sale price, or other parameters found in the item timelines adjusted to reflect the collection as a whole). As a result, a user is able to utilize the collections module to emphasize the combined value of their items 102 instead of only describing them or selling them individually.

The ownership module is able to enable established owners as indicated by the open registry 106 to control the access and/or descriptions provided on the items 102 and/or collections on the system 100. Specifically, the ownership module enables owners to selectively enable or disable each of the types of timeline posts described above (e.g. which product information is shown, events shown, authenticity data, condition, metadata, pricing) thereby customizing what is shown on the timeline for each of the items 102 and/or collections. Further, the ownership module is able to automatically transfer control over the timelines of the items 102 and/or collections to new owners/users when an ownership transaction has been completed as indicated by the open registry 106. For example, upon completion of a transfer of an item 102 from a first user to a second user, the ownership module automatically provides the item 102 data and control to the second user's account and removes the same from the first user's account. Further, as described above, the change of ownership is able to be automatically reflected in the item timeline as a transaction and new ownership information. Thus, the ownership module provides the advantage of enabling owners to control the manner that the owned items/collections are presented on the system by the description module.

The notification/follow module is able to enable users to select one or more owners, items and/or collections on the system 100 and be notified when changes to the associated descriptions occur. With respect to owners, a user is able to use the notification/follow module to cause the application to send a notification message to the user in response to updates of owner profile information (e.g. address, email, status), acquires a new item or sells an owned item, forms a new collection, and/or other owner related data changes. With respect to the collections, a user is able to use the notification/follow module to cause the application to send a notification message to the user in response to items 102 being added to or removed from one or more of the collections, price changes to collection values and/or listing prices and/or other collection related data changes. With respect to items 102, a user is able to use the notification/follow module to cause the application to send a notification message to the user in response to ownership of a followed item changing and/or any other parts of the description of the item 102 that change. The parts of the description (e.g. owner, condition, or other parts) that will trigger a notification are able to be selected by a user for one or more of the items 102. Further, in some embodiments, a user is able to select notification to occur whenever one or more of the items 102 or any of the items of a collection are within a specified proximity of the user's device 103 (as determined by the discovery module described in detail below). For example, the user is able to select a notification message to be sent whenever one or more specified items 102 are within a 5 mile radius of the device 103 wherein the distances and notification triggers are able to be different for each item 102. As a result, the notification/follow module enables the user to keep up to date on changes to items, owners and collections including on whether an item is nearby.

The discovery module is able to be selected by a user via the application user interface on the device 104 in order to detect and display some or all of the items 102 having tags 103 within a distance of the device 104 and/or within a selected area. Specifically, upon selection of a discovery feature, the discovery module is able to cause the reader 105 of the device 104 to scan for, discover and present some or all of the items 102 associated with tags 103 that are within the scanning range of the reader 105. Alternatively or in addition, upon selection of a discovery feature, the discovery module is able to access a list of one or more items 102 having tags 103 whose locations are currently stored within the server database and/or application database and display data (e.g. item information) about some or all of the items 102. The discovery module is able to enable a user to specify that all the items 102 be presented, that only items within the reader 105 scanning range be presented, that only the items within a selected distance radius of the device 104 be presented, that only items within a selected area (not necessarily centered around the device 104) be presented and/or a combination thereof. Further, the discovery module enables the presented items 102 to be filtered based on keywords, type (e.g. shoes, purses), availability (for sale, not for sale), age, value (e.g. estimated value, listed value), other item information parameters associated with the items 102 described herein or a combination thereof. As a result, using the discovery module, a user is able to determine if any collectable shoes having a tag 103 and that are for sale are within walking distance (e.g. 1 mile) or within a tradeshow building (e.g. within scanning range of the reader 105).

Further, once a list of the discovered items 103 is displayed on the device 104 by the application 107, upon selection of one or more of the presented items 103 on the list, the description module is able to present the social profile(s) of the selected items 103 in the same manner as description module selection described above for review by the user.

The transaction module is able enable users/owners to selectively offer one or more of the items 102 and/or collections for sale, wherein the option to purchase or make an offer to purchase such an item/collection is able to be added to the item description by the description module. The users/owners are able to specify a sale price for the item/collection and/or an open offer sheet wherein no price is set, but other users of the system are able to submit offers to the owner for the item/collection using an offer option of the transaction module. In some embodiments, a reserve is able to be set for one or more of the items/collections by the owner as a part of the offer option or an auction option. In some embodiments, the transaction module is able enable users/owners to selectively offer one or more of the items 102 and/or collections for trade or gift (e.g. trade for nothing/sale for free), wherein other users/owners of the system 100 are able to offer one or more other items/collections as consideration for the offered items/collections. In some embodiments, the owners/users are able to group a plurality of the items 102 for sale or trade as a group (but no necessarily as a collection for the purposes of the collection module). Additionally, in some embodiments the items 102 and/or collections are able to be sorted (e.g. as a part of the various sorting operations described herein) based on whether they are for trade or sale at a set price or accepting offers. In some embodiments, when a transaction is agreed upon the transaction module initiates the transaction on the open registry 106 according to the transfer of ownership protocol of the open registry 106 in order to complete the transaction, wherein upon completion the new ownership is reflected in the corresponding item/collection description by the description module. Alternatively, the transaction module is able to forward the buyer/seller to the open registry 106 such that the buyer/seller are able to complete the transaction on the open registry 106.

Additionally, in some embodiments the application is able to comprise a login and registration module and a payment module, wherein the application user interface is configured to enable users to utilize the application modules. The login and registration module enables a user to create a user profile/account by inputting username and password information via the graphical user interface that is then associated with the account such that the information is able to be used to identify the user when logging onto the application. Alternatively, the login information is able to be omitted and a user is able to use the application without creating a user account or logging in. After a user account is created, the user is able to access the account by entering the username and password in order to identify themselves to the application. In some embodiments, during the creation of the account or subsequently, additional information is able to be stored and associated with the account such as, but not limited to, contact information (e.g. phone number, email, address), submitted content (e.g. item images, descriptions), account privileges/subscription information (e.g. unlocked application features), friends or other trusted accounts on the system and payment information. In some embodiments, the additional information is submitted by a user upon logging into the account. Alternatively, some or all of the additional information is able to be applied to the account automatically by the application 107 based on interactions by the user with the application 107. In some embodiments, as described above, the permissions granted to an account (e.g. control over one or more item profiles) are able to be automatically transferred to one or more different accounts based on the account transferring ownership of the one or more items 102 associated with the item profiles to the different accounts as recorded by the open registry 106. Thus, the same login and password is able to automatically provide access to and control over newly acquired items 102 and their associated profiles when the acquisition is complete.

Figure 9:
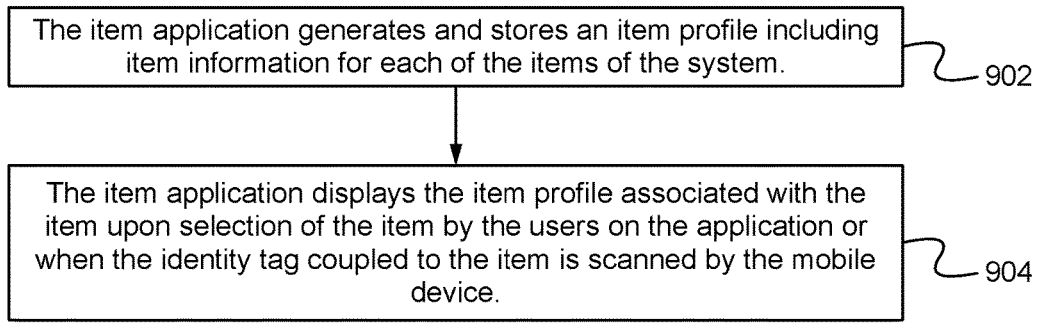
FIG. 9 illustrates a method of using an item application according to some embodiments.

FIG. 9 illustrates a method of using the item application of the system 100 according to some embodiments. As shown in FIG. 9, the item application generates and stores an item profile including item information for each of the items 102 of the system 100 at the step 902. The item application displays the item profile associated with the item 102 upon selection of the item by the users on the application or when the identity tag 103 coupled to the item is scanned by the mobile device 104 at the step 904. In some embodiments, the open registry stores a chain of ownership that defines a sequence of owners of each of the items and a sequence of transactions between pairs of the owners that conferred the ownership of the item between the pairs. In some embodiments, the method further comprises, for each of one or more of the items 102, dynamically automatically importing the chain of ownership of the item 102 with the item application from the open registry 106 and posting onto the item profile ownership data describing all of the transfers of ownership recorded based on the chain of ownership. In some embodiments, the method further comprises, when the chain of ownership of one or more of the items 102 changes on the open registry 106 due to a transaction, automatically updating the ownership data of the one or more items 102 with the item application to reflect the changes. In some embodiments, the method further comprises enabling an owner of one of the items 102 to select which of the item information is included within the item profile of the item 102 with the item application. In some embodiments, the method further comprises, for each of the items, enabling users to post to the item profile ratings of the item and pictures of the item 102 to the item with the item application. In some embodiments, the method further comprises, for each of the item profiles, when displaying the item profile, ordering all of the posts with the item application such that the posts are displayed chronologically on the device 104.

In some embodiments, the method further comprises enabling the owner of one or more of the items 102 to add a purchase feature to the item profile of the one or more items 102 with the item application, wherein the purchase feature enables users to submit a purchase price, submit a monetary offer or submit a trade offer in order to purchase the item 102. In some embodiments, the method further comprises enabling a plurality of the items 102 owned by the same owner to be grouped into a collection by the owner by the item application such that users are able to search based on or browse within a selected one or more of the collections via the item application and generating a collection profile for the collection with the item application. In some embodiments, at least on of the item profiles include a network accessible location related to the item including information about the item 102. In some embodiments, the method further comprises, when the open registry 106 indicates that ownership of one or more of the items has been transferred form a previous owner to a new owner, automatically switching control over the item profiles of the one or more items 102 from an account of the previous owner to an account of the new owner with the item application.

Figure 10:
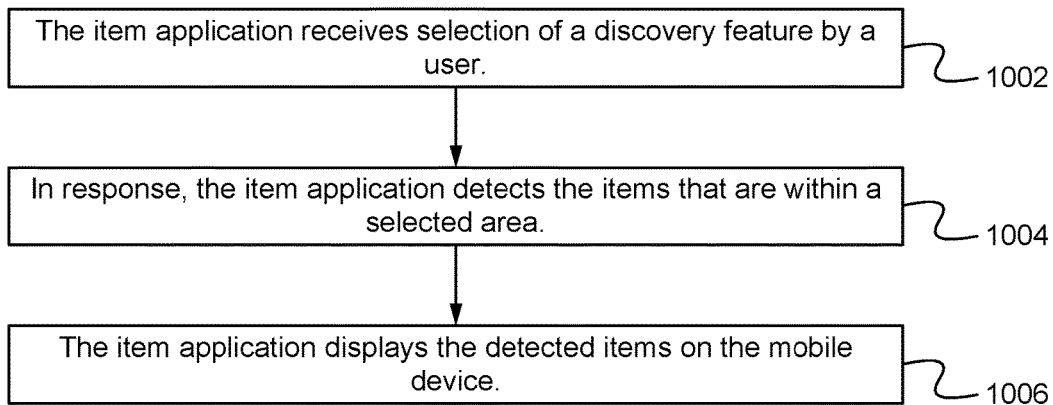
FIG. 10 illustrates a method of using the item application of the system 100 according to some embodiments.

FIG. 10 illustrates a method of using the item application of the system 100 according to some embodiments. As shown in FIG. 10, the item application receives selection of a discovery feature by a user at the step 1002. In response, the item application detects the items 102 that are within a selected area at the step 1004. The item application displays the detected items 102 on the mobile device 104 at the step 1006. In some embodiments, the selected area is defined by a range of a wireless reader 105 of the mobile device 104 that wirelessly reads the identity tags 103. In some embodiments, the method further comprises displaying a map on the mobile device 104 with the item application, wherein the selected area is defined by a portion of the map. In some embodiments, the method further comprises enabling a user to select the position and size of the portion of the map that is displayed on the mobile device 104 with the item application thereby defining the selected area. In some embodiments, detecting the items 102 within the selected area comprises accessing one or more servers 108 storing current positions of the items 102.

In some embodiments, the method further comprises displaying a list of the items 102 discovered within the selected area on the mobile device 104 with the item application, wherein upon selection of one of the items 102 from the list, the item application displays an item profile associated with the one of the items 102 that chronologically describes the one of the items 102. In some embodiments, the method further comprises enabling the list of the items discovered within the selected area to be filtered based on one or more of keywords, item type and item cost with the item application. In some embodiments, the method further comprises enabling the owner of one or more of the items 102 to add a purchase feature to the item profile of the one or more items with the item application, wherein the purchase feature enables users to submit a purchase price, submit a monetary offer or submit a trade offer in order to purchase the item. In some embodiments, the method further comprises, upon selection of the purchase feature for a desired purchase, automatically initiating a transaction on the open registry 106 with the item application such that the open registry 106 reflects a change of ownership of one or more items 102 associated with the desired purchase.

Figure 3:
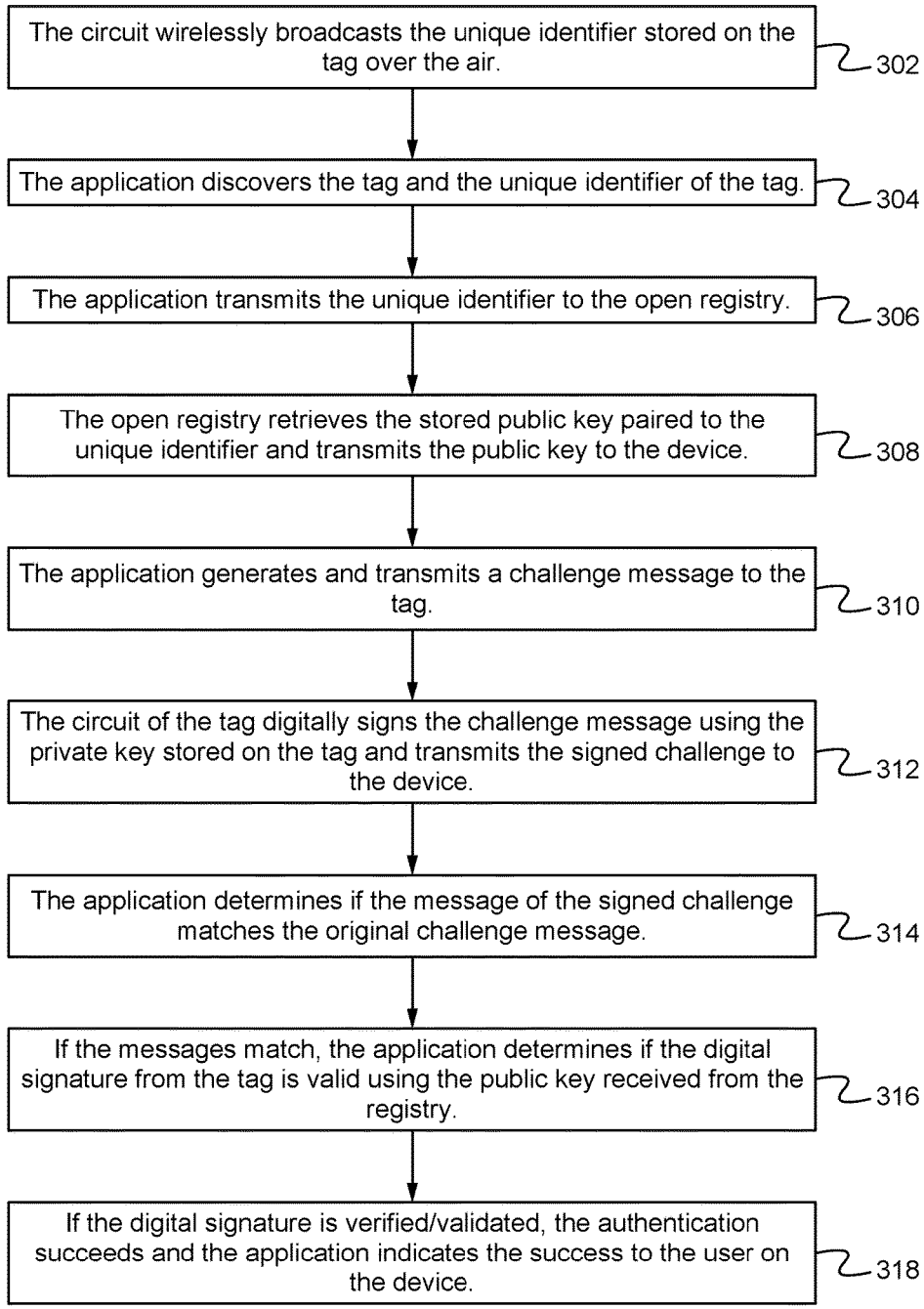
FIG. 3 illustrates an item authentication method using the system according to some embodiments.

FIG. 3 illustrates an item authentication method using the system 100 according to some embodiments. As shown in FIG. 3, the circuit 206 of the tag 103 on an item 102 wirelessly broadcasts the unique identifier stored on the tag 103 over the air at the step 302. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 304. In some embodiments, the application 107 provides an authentication option of the authentication module to a user on the device 104 and automatically/continuously monitors for tags 103 (and/or the associated identifiers) to discover when the authentication option is selected. Alternatively, the application 107 is able to automatically monitor for tags 103 (and/or identifiers) and displays the authentication option of the authentication module on the device 104 when a tag 103 (and/or identifier) is discovered. In such embodiments, the application 107 is able to await selection of the authentication option before proceeding with the remainder of the method steps. After receiving the unique identifier, the application 107 on the device 103 transmits the unique identifier to the open registry 106 over the network 110 at the step 306. Upon receiving the unique identifier, the open registry 106 retrieves the stored public key paired to the unique identifier that matches the received unique identifier and transmits the public key to the device 104 over the network 110 at the step 308. Additionally, in some embodiments the registry 106 is able to transmit the chain of ownership or other item related data (e.g. the current owner) associated with the unique identifier to the device 104. If no pairs match the received unique identifier, the authentication fails and the registry 106 instead sends a failure message to the device 104 which then indicates the failure on the device 104 to the user via the application 107.

After or concurrently with steps 306 and 306, the application 107 on the device 104 generates and transmits a challenge message (e.g. a random data set, a data set received from the registry 106) to the tag 103 at the step 310. Upon receiving the challenge message, the circuit 206 of the tag 103 digitally signs the challenge message using the private key stored on the tag 103 and transmits the signed challenge (e.g. the digital signature and the challenge message) to the device 104 via the reader 105 at the step 312. In some embodiments, the digital signature is a hash of the challenge message using the private key. Alternatively, the digital signature is able to be other modulations of and/or operations performed on the message using the private key.

The application 107 determines if the message of the signed challenge matches the original challenge message at the step 314. If the messages do not match, the authentication fails and the application 107 indicates the failure to a user on the device 104. If the messages match, the application 107 determines if the digital signature from the tag 103 is valid using the public key received from the registry 106 at the step 316. In some embodiments, determining if the digital signature if valid comprises generating a public signature using the public key and the challenge message and determining if it matches or corresponds to the digital signature. Alternatively, other signature validation methods are able to be used based on the public key and the challenge message. Alternatively, the open registry 106 is able to perform some or all of the signature validation. Specifically, the open registry 106 is able to receive the challenge message from the device 104 and generate and send to a public signature based on the public key and the challenge message to the application 107. In such embodiments, the application 107 only needs to determine if the public signature matches or corresponds to the digital signature from the tag 103 in order to determine if the digital signature if valid. Alternatively, the application 107 is able to further forward the signed message (e.g. the digital signature and the challenge message) received from the tag 103 to the registry 106 such that all the validation is performed by the registry 106 which then indicates to the device 104 whether the authentication was a success.

If the digital signature is not verified or validated using the public key, the authentication fails and the application 107 indicates the failure to a user on the device 104. If the digital signature is verified/validated, the authentication succeeds and the application 107 indicates the success to the user on the device 104 at the step 318. As a result, the method provides the advantage of enabling a user to authenticate that the item 102 is genuine and/or the current owner of the item 102. In some embodiments, indicating the success to the user on the device 104 comprises presenting the chain of ownership information and/or the item information (e.g. stored on the device 104, the servers 108 or both) corresponding to the item 102 to the user on the device 104 using the description module. In such embodiments, the presenting of the item information is able to comprise the automatic navigation to a network accessible address of the item information (e.g. via the application 107 or a web browser) and/or the presentation of a link to the network accessible address to a user. In some embodiments, the method further comprises obtaining proof of ownership data from a user and authenticating the proof of ownership data based on the records and/or protocols of the registry 106 in order to authenticate the ownership. In such embodiments, the application 107 is able to indicate successful authentication of ownership to the user on the device 104. In some embodiments, the authentication method is used by IOT devices and autonomous machines to recognize objects and execute their programmed behavior accordingly. In some embodiments, the authentication method is used by IOT devices and autonomous machines to recognize other IOT devices and machines and engage them accordingly to their programs, including performing a task and establishing a connection/communication.

Figure 4:
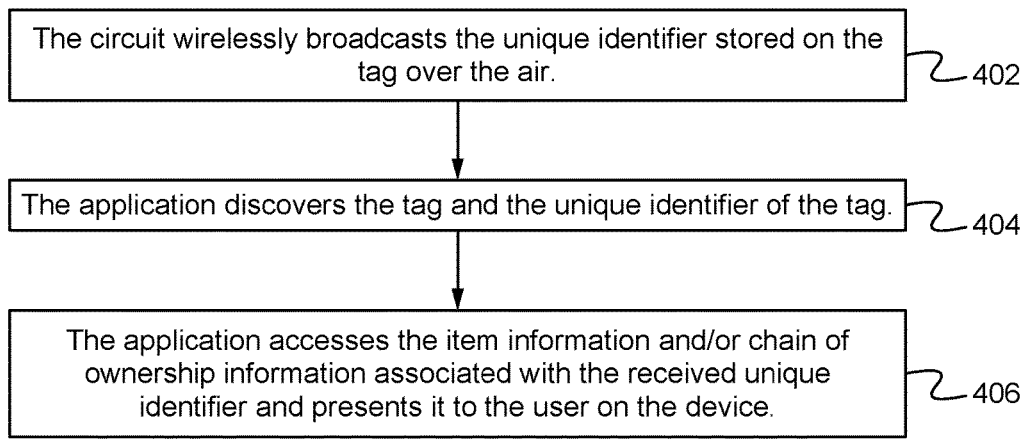
FIG. 4 illustrates a method of presenting item information according to some embodiments.

FIG. 4 illustrates a method of presenting item information according to some embodiments. As shown in FIG. 4, the circuit 206 of the tag 103 on an item 102 wirelessly broadcasts the unique identifier stored on the tag 103 over the air at the step 402. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 404. In some embodiments, the application 107 provides an authentication option of the authentication module to a user on the device 104 and automatically/continuously monitors for tags 103 (and/or the associated identifiers) to discover when the authentication option is selected. Alternatively, the application 107 is able to automatically monitor for tags 103 (and/or identifiers) and displays the authentication option of the authentication module on the device 104 when a tag 103 (and/or identifier) is discovered. In such embodiments, the application 107 is able to await selection of the authentication option before proceeding with the remainder of the method steps. After receiving the unique identifier, the application 107 on the device 103 accesses the item information (on the device 104 and/or the servers 108) and/or chain of ownership information associated with the received unique identifier and presents the chain of ownership information and/or the item information to the user on the device 104 using the description module at the step 406. In some embodiments, the presenting of the item information is able to comprise the automatic navigation to a network accessible address of the item information (e.g. via the application 107 or a web browser) and/or the presentation of a link to the network accessible address to a user on the device 104. Alternatively or in addition, the presenting of the item information is able to comprise accessing the item information associated with the unique identifier on the servers 108, locally on the device 104 and/or on the open registry 106 over the network 110. As a result, the method provides the advantage of enabling a user to quickly find authenticated information about an item and/or be forwarded to a location (e.g. website) with information about the item.

Figure 5:
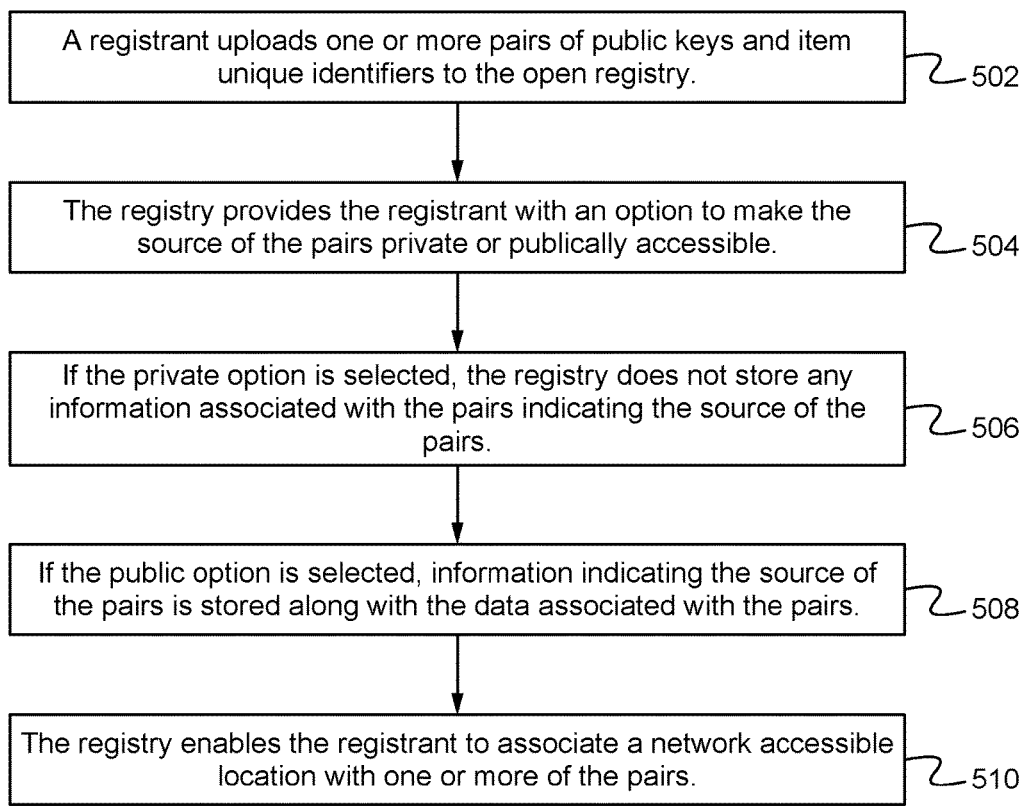
FIG. 5 illustrates a method of registering items on the open database according to some embodiments.

FIG. 5 illustrates a method of registering items 102 on the registry 106 according to some embodiments. As shown in FIG. 5, a registrant uploads one or more pairs of public keys and item unique identifiers to the open registry 106 over the network 110 at the step 502. The public keys correspond to the private keys stored in the tags 103 along with the item unique identifiers to which the public keys are paired. The registry 106 provides the registrant with an option to make the source (e.g. the registrant or owner) of the pairs private or publically accessible at the step 504. If the private option is selected, the registry 106 does not store any information associated with the pairs indicating the source of the pairs at the step 506. If the public option is selected, information indicating the source of the pairs is stored along with the data associated with the pairs (e.g. optional chain of ownership data, other item information data) at the step 508.

The registry 106 enables the registrant to associate a network accessible location (e.g. cloud server, website) with one or more of the pairs at the step 510. In some embodiments, the network accessible location requires proof of proximity, as described below, before enabling access to digital content and/or executing services or programs related to the pairs provided by the network accessible location. Thus, the registration method provides the advantage of enabling owners or registrants to remain anonymous if desired and/or to restrict access to a network accessible location associated with the items 102 (associated with the uploaded pairs) unless a proof of proximity or authentication process is completed. Thus, the method enables the registrants to protect themselves from competitive product size release determination while still utilizing an open registry 106.

Figure 6:
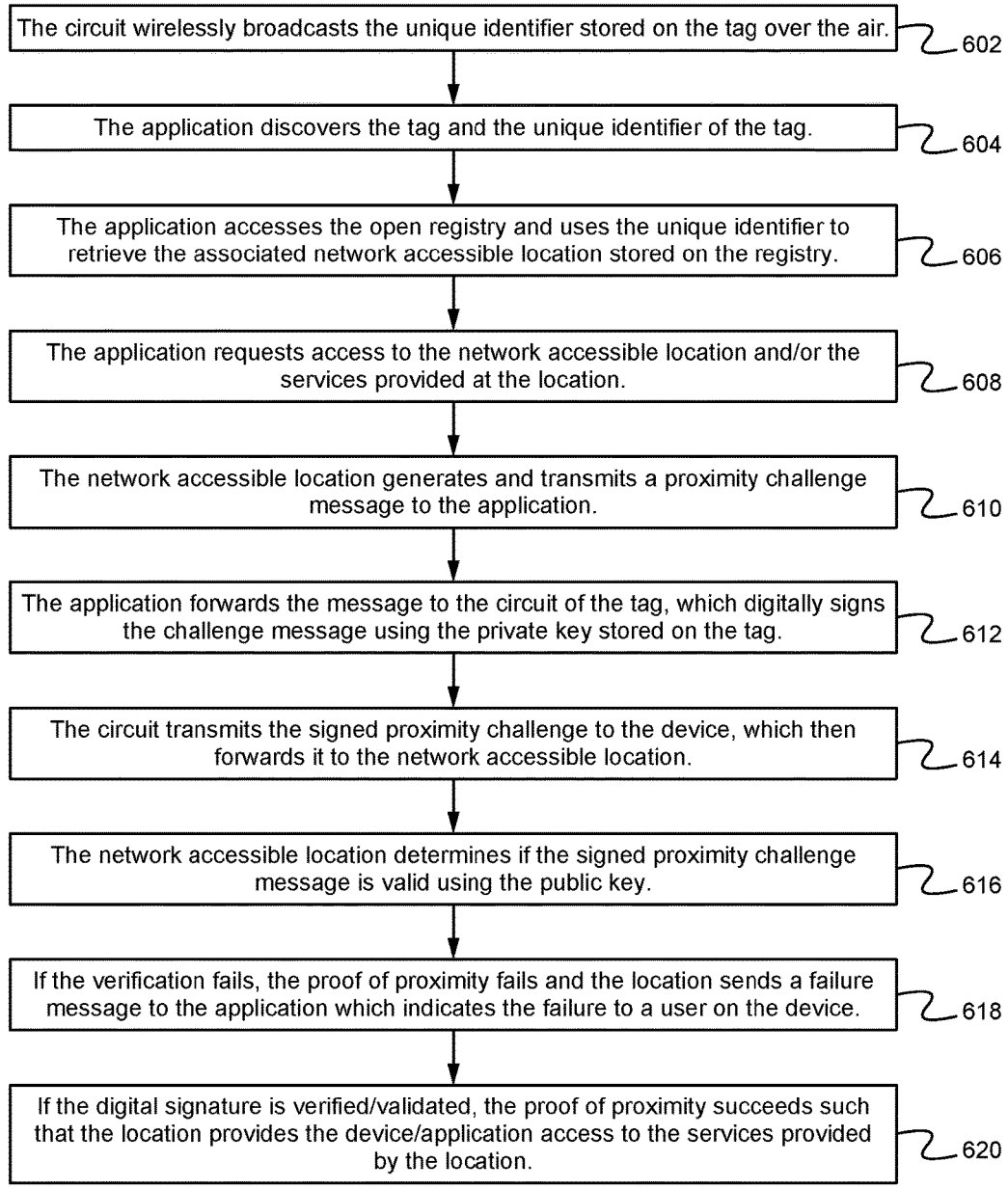
FIG. 6 illustrates a proof of proximity method according to some embodiments.

FIG. 6 illustrates a proof of proximity method according to some embodiments. As shown in FIG. 6, the circuit 206 of the tag 103 on an item 102 wirelessly broadcasts the unique identifier stored on the tag 103 over the air at the step 602. Alternatively, the circuit 206 is able to only broadcast after being interrogated by a reader (e.g. the application 107 of a device 104). The application 107 of a device 104 in proximity of the tag 103 discovers the tag 103 and the unique identifier of the tag 103 at the step 604. In some embodiments, the application 107 provides a proof of proximity option of the proof of proximity module to a user on the device 104 and automatically/continuously monitors for tags 103 (and/or the associated identifiers) to discover when the proof of proximity option is selected. Alternatively, the application 107 is able to automatically monitor for tags 103 (and/or identifiers) and displays the proof of proximity option of the proof of proximity module on the device 104 when a tag 103 (and/or identifier) is discovered. In such embodiments, the application 107 is able to await selection of the proof of proximity option before proceeding with the remainder of the method steps. In some embodiments, the proof of proximity and authentication options are able to be presented simultaneously and/or concurrently by the application 107 such that a user is able to select whether they want to perform an authentication method, proximity method, or both on the discovered tag 103.

After receiving the unique identifier, the application 107 accesses the open registry 106 and uses the unique identifier to retrieves the associated network accessible location stored on the registry 106 at the step 606. Additionally, in some embodiments the application 107 is able to concurrently access the other data (e.g. chain of ownership and/or other item information data) associated with the unique identifier on the registry 106. If no pairs match the received unique identifier, the proof of proximity fails and the device 104 indicates the failure on the device 104 to the user via the application 107. Alternatively, if the network accessible location and associated unique identifier is stored on the servers 108 and/or the device 104, the application 107 on the device 104 is able to omit the communication with the registry 106 and instead obtain the network accessible location associated with the unique identifier locally or in the same manner from the servers 108.

The application 107 requests access to the network accessible location and/or the services provided at the location at the step 608. In some embodiments, the services comprise one or more of digital content, raw data, execution of a program or other services related to the unique identifier (and/or the item 102 coupled to the tag 103). The network accessible location (e.g. cloud server, website server) generates and transmits a proximity challenge message to the application 107 on the device 104 in response to the access request at the step 610. In some embodiments, the proximity challenge message is able to be similar to the authentication challenge message described above. For example, the proximity challenge message is able to be a random string, the unique identifier or other data sets. Upon receiving the proximity challenge message, application 107 on the device 104 forwards the message to the circuit 206 of the tag 103, which digitally signs the challenge message using the private key stored on the tag 103 at the step 612. The circuit 206 then transmits the signed proximity challenge (e.g. the digital signature and the challenge message) to the device 104 via the reader 105 which then forwards it to the network accessible location via the network 110 at the step 614. In some embodiments, the digital signature is a hash of the challenge message using the private key. Alternatively, the digital signature is able to be other modulations of or operation on the message using the private key.

The network accessible location determines if the signed proximity challenge message is valid using the public key at the step 618. In some embodiments, the network accessible location locally stores a copy of the public key paired with the unique identifier. Alternatively, the location is able to request/receive the public key from the registry 106, the servers 108, the device 104 or a combination thereof. The verification of the signed challenge is able to be performed in the same manner as the verification of the signed authentication message described above in the item authentication method. Specifically, the network accessible location is able to determine validity if both the signed challenge matches the original proximity challenge message and the submitted signature validates against the public key associated with the private key of the tag 103. If the verification fails (e.g. due to the messages not matching and/or due to the signature being incorrect), the proof of proximity fails and the location sends a failure message to the application 107 which indicates the failure to a user on the device 104 at the step 618. If the digital signature is verified/validated, the proof of proximity succeeds such that the location provides the device/application 104/107 access to the services provided by the location at the step 620. The application 107 is then able to provide the user with access to the services via the device 104. As a result, the method provides the advantage of enabling registrants to require a proof of proximity before providing access to item related information and/or features from a network accessible location. Indeed, this also serves to help ensure the anonymity of the registry 106 as the item related information (which likely indicates the source/registrant of the item 102) is able to be separate from the data on the open registry 106 (such that it is shielded from the public).

In some embodiments, the network accessible location is able to restrict access based on the proof of proximity method combined with other protocols (e.g. developer tokens, user authentication) such that both must be satisfied for access to be granted. In some embodiments, the network accessible location is a smart contract operating on a blockchain database (e.g. the registry 106). In some embodiments, the providing access to the content/features of the location is able to comprise the automatic navigation to the network accessible address by the device 104 (e.g. via the application 107 or a web browser) and/or the presentation of a link to the network accessible address on the device/application 104/107 to a user. In some embodiments, the application 107 on the device 104 and/or the servers 108 are able to perform the verification of the signed proximity challenge message. In such embodiments, if performed on the device 104 the signed message does not need to be forwarded and instead the public key is requested/received from the registry 106 and/or the network accessible location to perform the verification. Similarly, if performed by the servers 108 (e.g. by the agent/application 107 on the servers 108), the signed message is forwarded to the servers 108 which either currently store or request/receive the public key from the registry 106 and/or the network accessible location to perform the verification. The network accessible location described herein is able to refer to the address itself and/or the computers/servers operating the website and/or other services provided at the network accessible location.

Figure 7:
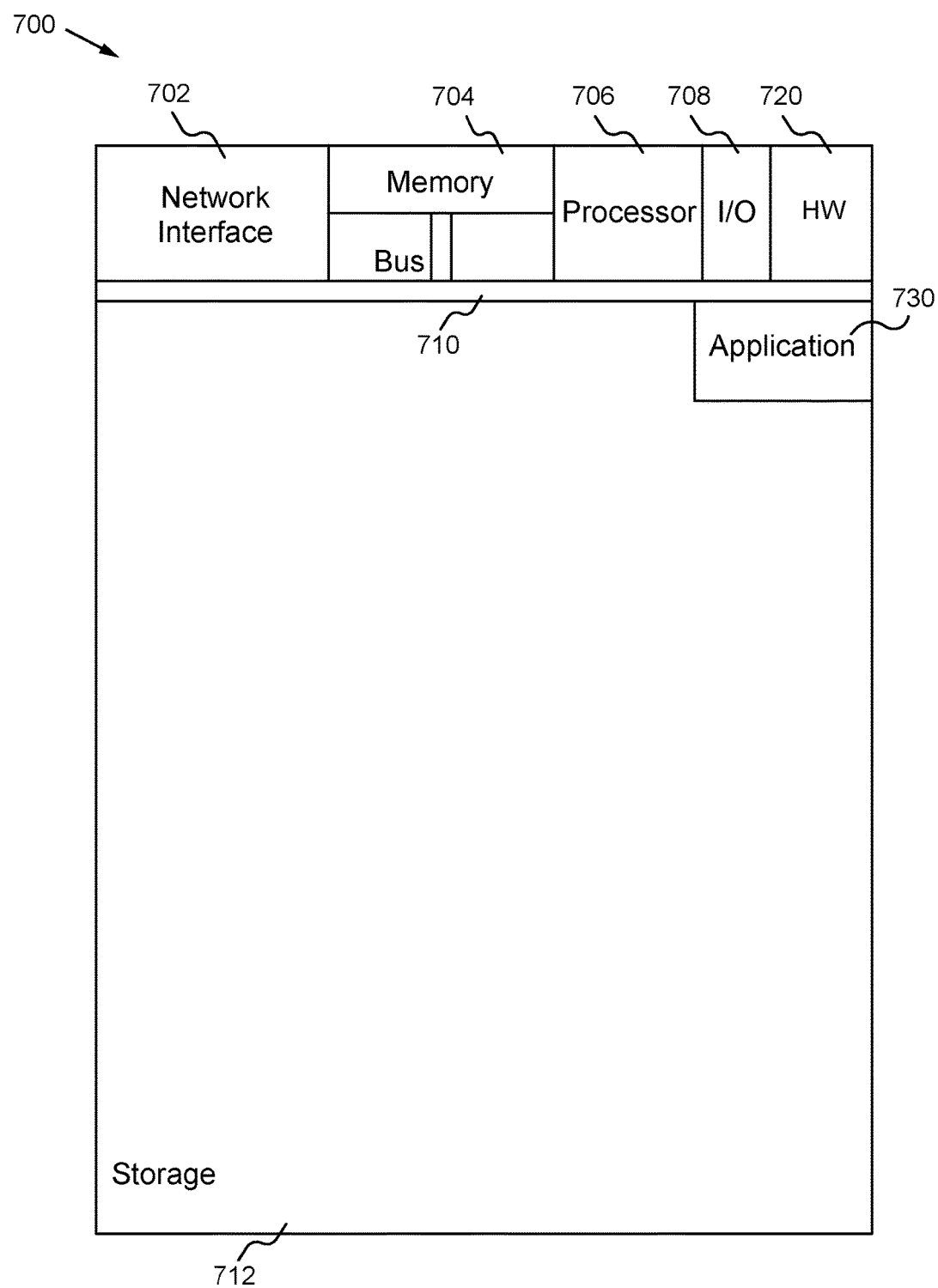
FIG. 7 illustrates a block diagram of an exemplary computing device configured to implement the system according to some embodiments.

FIG. 7 illustrates a block diagram of an exemplary computing device 700 configured to implement the system 100 according to some embodiments. In addition to the features described above, the computing devices 104 and/or servers 108 are able to be substantially similar to the device 700. In general, a hardware structure suitable for implementing the computing device 700 includes a network interface 702, a memory 704, a processor 706, I/O device(s) 708 (e.g. reader 105), a bus 710 and a storage device 712. Alternatively, one or more of the illustrated components are able to be removed or substituted for other components well known in the art. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Authentication system application 107 or module(s) thereof are likely to be stored in the storage device 712 and memory 704 and processed as applications are typically processed. More or fewer components shown in FIG. 7 are able to be included in the computing device 700. In some embodiments, authentication system hardware 720 is included. Although the computing device 700 in FIG. 7 includes applications 730 and hardware 720 for the authentication system, the authentication system is able to be implemented on a computing device in hardware, firmware, software or any combination thereof.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An item profile, open registry and authentication system, the system comprising:
   one or more physical items;
   one or more identity tags each coupled to one of the physical items, the identity tags each storing a private key and a unique identifier and configured to enable the unique identifier to be wirelessly read but prevent the private key from being read from the tag;

a mobile device storing an item application and configured to wirelessly read the unique identifier from one or more of the identity tags when proximate to the one or more of the tags, wherein the item application generates and stores an item profile including item information for each of the physical items and displays the item profile associated with one of the physical items when the identity tag coupled to the one of the physical items is scanned by the device, wherein the item application enables an owner of one of the physical items to identify one or more portions of the item profile as being private and the item application refrains from displaying the one or more portions the item profile when the item profile is displayed; and a open registry storing the unique identifier and a public key of each of the physical items, wherein the public key is associated with the private key stored on the identity tag coupled to the physical item.

2. The system of claim 1, wherein the open registry stores a chain of ownership that defines a sequence of owners of each of the physical items and a sequence of transactions between pairs of the owners that conferred the ownership of the physical item between the pairs.

3. The system of claim 2, wherein the item application, for each of one or more of the physical items, dynamically automatically imports the chain of ownership of the physical item from the open registry and posts onto the item profile one or more posts including ownership data describing all of the transfers of ownership recorded based on the chain of ownership.

4. The system of claim 3, wherein when the chain of ownership of one or more of the physical items changes on the open registry due to a transaction, the item application automatically updates the ownership data of the one or more physical items to reflect the changes.

5. The system of claim 4, wherein, for each of the physical items, the item application enables users to post to the item profile posts including ratings of the physical item and pictures of the physical item.

6. The system of claim 5, wherein, for each of the item profiles, when displaying the item profile the application orders all of the posts such that the posts are displayed chronologically in a list by interleaving the posts that include the ownership data with the posts that are ratings of the physical items and with the posts that are pictures of the physical items within the list based on a time associated with each of the posts.

7. The system of claim 6, wherein the item application enables the owner of one or more of the physical items to add a purchase feature to the item profile of the one or more physical items, wherein the purchase feature enables users to submit a purchase price, submit a monetary offer or submit a trade offer in order to purchase the physical item.

8. The system of claim 7, wherein the application enables a plurality of the physical items owned by a same owner to be grouped into a collection by the owner such that users are able to search based on or browse within a selected one or more of the collections, and further wherein the item application generates a collection profile for the collection.

9. The system of claim 8, wherein at least one of the item profiles include a network accessible location related to the physical item including information about the physical item.

10. The system of claim 9, wherein when the open registry indicates that ownership of one or more of the physical items has been transferred from a previous owner to a new owner, the item application automatically switches control over the item profiles of the one or more physical items from an account of the previous owner to an account of the new owner.

11. A mobile device for use in an item open registry and authentication system, the mobile device comprising:

a wireless signal transceiver for communicating data wirelessly between the mobile device and one or more identity tags each coupled to one of one or more physical items, the identity tags each storing a private key and a unique identifier and configured to enable the unique identifier to be wirelessly read but prevent the private key from being read from the tag;

a network interface for communicating with an open registry storing the unique identifier, item information and a public key of each of the physical items, wherein the public key is associated with the private key stored on the identity tag coupled to the physical item, wherein the item application enables an owner of one of the physical items to identify one or more portions of the item profile as being private and the item application refrains from displaying the one or more portions the item profile when the item profile is displayed; and a non-transitory computer readable medium storing an item application that controls the communication between the mobile device and the tags and the registry, automatically wirelessly searches for the tags and prompts a user on the mobile device when one of the tags is discovered, and further wherein the item application generates and stores an item profile including physical item information for each of the physical items and displays the item profile associated with one of the physical items when the identity tag coupled to the one of the physical items is scanned by the transceiver.

12. The mobile device of claim 11, wherein the open registry stores a chain of ownership that defines a sequence of owners of each of the physical items and a sequence of transactions between pairs of the owners that conferred the ownership of the physical item between the pairs.

13. The mobile device of claim 12, wherein the item application, for each of one or more of the physical items, dynamically automatically imports the chain of ownership of the physical item from the open registry and posts onto the item profile one or more posts including ownership data describing all of the transfers of ownership recorded based on the chain of ownership.

14. The mobile device of claim 13, wherein when the chain of ownership of one or more of the physical items changes on the open registry due to a transaction, the item application automatically updates the ownership data of the one or more physical items to reflect the changes.

15. The mobile device of claim 14, wherein, for each of the physical items, the item application enables users to post to the item profile posts including ratings of the physical item and pictures of the physical item.

16. The mobile device of claim 15, wherein, for each of the item profiles, when displaying the item profile the application orders all of the posts such that the posts are displayed chronologically in a list by interleaving the posts that include the ownership data with the posts that are ratings of the physical items and with the posts that are pictures of the physical items within the list based on a time associated with each of the posts.

17. The mobile device of claim 16, wherein the item application enables the owner of one or more of the physical items to add a purchase feature to the item profile of the one or more physical items, wherein the purchase feature enables users to submit a purchase price, submit a monetary offer or submit a trade offer in order to purchase the physical item.

18. The mobile device of claim 17, wherein the application enables a plurality of the physical items owned by a same owner to be grouped into a collection by the owner such that users are able to search based on or browse within a selected one or more of the collections, and further wherein the item application generates a collection profile for the collection.

19. The mobile device of claim 18, wherein at least one of the item profiles include a network accessible location related to the physical item including information about the physical item.

20. The mobile device of claim 19, wherein when the open registry indicates that ownership of one or more of the physical items has been transferred from a previous owner to a new owner, the item application automatically switches control over the item profiles of the one or more physical items from an account of the previous owner to an account of the new owner.

21. The device of claim 20, wherein in response to a successful authentication of one of the physical items by the item application, the item application automatically accesses and displays the network accessible location on a display of the mobile device.

22. The device of claim 21, wherein the network accessible location is a website related to the physical item including information about the physical item.

23. A method of using an item application of an authentication system including one or more physical items, one or more identity tags each coupled to one of the physical items, the identity tags each storing a private key and a unique identifier and configured to enable the unique identifier to be wirelessly read but prevent the private key from being read from the tag, a mobile device storing the item application and configured to wirelessly read the unique identifier from one or more of the identity tags when proximate to the one or more of the tags, and a open registry storing the unique identifier and a public key of each of the physical items, wherein the public key is associated with the private key stored on the identity tag coupled to the physical item, the method comprising:
  generating and storing an item profile including item information for each of the physical items with the item application;
  enabling, with the item application, an owner of one of the physical items to identify one or more portions of the item profile as being private; and
  displaying portions of the item profile associated with one of the physical items that are not identified as private with the item application when the identity tag coupled to the one of the physical items is scanned by the mobile device.

24. The method of claim 23, wherein the open registry stores a chain of ownership that defines a sequence of owners of each of the physical items and a sequence of transactions between pairs of the owners that conferred the ownership of the physical item between the pairs.

25. The method of claim 24, further comprising, for each of one or more of the physical items, dynamically automatically importing the chain of ownership of the physical item with the item application from the open registry and posting with the item application, onto the item profile, one or more posts including ownership data describing all of the transfers of ownership recorded based on the chain of ownership.

26. The method of claim 25, further comprising, when the chain of ownership of one or more of the physical items changes on the open registry due to a transaction, automatically updating the ownership data of the one or more physical items with the item application to reflect the changes.

27. The method of claim 25, further comprising, for each of the physical items, enabling users to post to the item profile posts including ratings of the physical item and pictures of the physical item with the item application.

28. The method of claim 27, further comprising, for each of the item profiles, when displaying the item profile, ordering all of the posts with the item application such that the posts are displayed chronologically on the device in a list by interleaving the posts that include the ownership data with the posts that are ratings of the physical items and with the posts that are pictures of the physical items within the list based on a time associated with each of the posts.

29. The method of claim 28, further comprising enabling the owner of one or more of the physical items to add a purchase feature to the item profile of the one or more physical items with the item application, wherein the purchase feature enables users to submit a purchase price, submit a monetary offer or submit a trade offer in order to purchase the physical item.

30. The method of claim 29, further comprising:
  enabling a plurality of the physical items owned by a same owner to be grouped into a collection by the owner by the item application such that users are able to search based on or browse within a selected one or more of the collections; and
  generating a collection profile for the collection with the item application.

31. The method of claim 30, wherein at least one of the item profiles include a network accessible location related to the physical item including information about the physical item.

32. The method of claim 31, further comprising, when the open registry indicates that ownership of one or more of the physical items has been transferred from a previous owner to a new owner, automatically switching control over the item profiles of the one or more physical items from an account of the previous owner to an account of the new owner with the item application.

33. The method of claim 32, further comprising, in response to a successful authentication of one of the physical items by the item application, automatically accessing and displaying the network accessible location on a display of the mobile device with the item application.

34. The method of claim 33, wherein the network accessible location is a website related to the physical item including information about the physical item.

* * * * *